Feb. 8, 1949.　　　　I. V. THULIN　　　2,460,858
CHUCK
Filed June 2, 1947

*INVENTOR.*
IVAN V. THULIN
BY
ATTORNEY

Patented Feb. 8, 1949

2,460,858

UNITED STATES PATENT OFFICE 2,460,858

CHUCK

Ivan V. Thulin, Upper Darby, Pa.

Application June 2, 1947, Serial No. 751,943

10 Claims. (Cl. 219—4)

(Granted under the act of March 3, 1883, as amended April 30, 1928; 370 O. G. 757)

The present invention concerns a chuck and particularly concerns a chuck for use with an electric stud-welding gun and in which detachable jaws are resiliently mounted on the chuck head to engage yieldingly a workpiece.

Insulating material such as fibre glass is customarily fastened to metal panels and metal bulkheads aboard ship by means of Nelson nails. A Nelson nail is a metal fastening device having a thin disc-shaped head of the order of 1½" in diameter and an elongated thin shank of the order of 1" in length which is pointed at the end. To perform the fastening operation a Nelson nail is mounted with the head thereof in the chuck of an electric stud-welding gun and with the point of the shank extending away from the gun. The nail shank is forced through the fibre glass toward the metal bulkhead and electric current is passed from the welding gun through the nail to the bulkhead forming a high-temperature arc. The tip of the Nelson nail is fused by the high-temperature arc and upon contact with the metal bulkhead is welded thereto.

Prior to the present invention difficulty has always been encountered in the structure and operation of the electric stud-welding-gun chuck for holding the Nelson nail. A primary requirement is that the nail head during insertion in the chuck be guided by the jaws into its proper location in the chuck and then firmly gripped during insertion through the fibre glass and during the fusing and welding operation. After completion of the operation it is necessary that separation of the nail and chuck can be simply effected by a slight twisting of the chuck and withdrawal of the welding gun. It is also necessary that the chuck be capable of accommodating itself to nail heads of different sizes because the nail heads which are customarily used are not of uniform dimensions. A further requirement is that the chuck head be constructed so that good electrical contact with the nail is effected.

Prior chucks have proven defective in numerous respects. Chucks made to grip the nail head firmly during welding fail to release the nail head after the operation is complete and fail to accommodate nail heads of different sizes. Chucks that accommodate nail heads of different sizes and that readily release the nail after completion of the welding operation fail to grip the nail head firmly during insertion through the fibre glass and during fusing and welding. Faulty electrical contact between the chuck and nail is a common defect with the result that localized arcing occurs between the chuck and nail, resulting in burning, warping and pitting of the chuck.

The present invention overcomes these defects by providing a chuck having a plurality of jaws resiliently mounted on the chuck head to engage yieldingly the workpiece. The resilient mounting for the jaws is arranged so that tension of the resilient mounting can be regulated to contorl the gripping force of the jaws relative to a workpiece. An electrical contact element is mounted on the chuck head adjacent the jaws to position and contact a workpiece.

An object of the invention is to provide a chuck that is suitable for use with an electric stud-welding gun.

Another object is to provide a chuck having detachable jaws that are resiliently mounted to engage yieldingly a workpiece.

Another object is to provide a chuck having an electrical contact element in the chuck head to position a workpiece and make electrical contact therewith.

Further objects and advantages of this invention, as well as its construction, arrangement and operation will be apparent from the following description and claims in connection with the accompanying drawings in which:

Figures 1, 2:
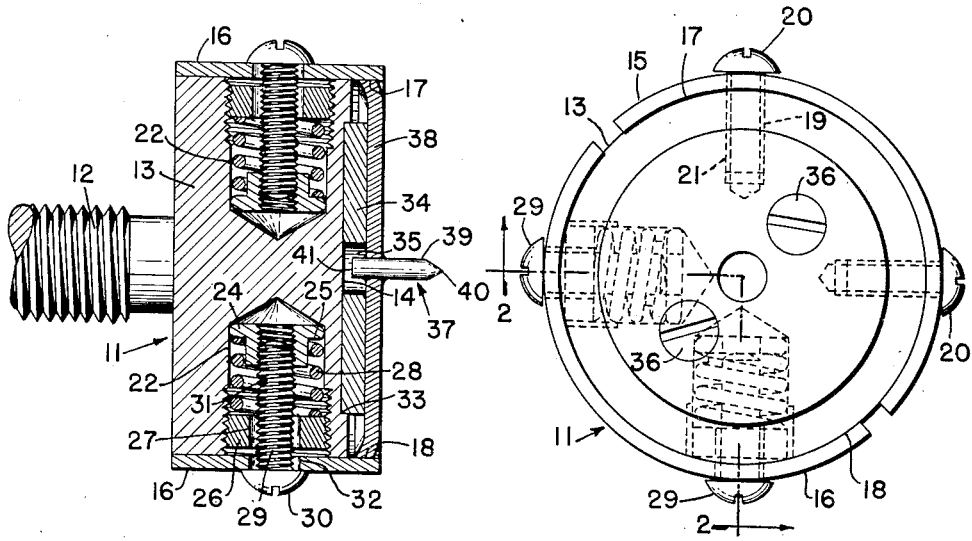
Fig. 1 is an elevational view of the end face of a preferred form of chuck without a workpiece in position.
Fig. 2 is a sectional view along line 2—2 of Fig. 1 showing the resilient mounting for the gripping jaws, the electrical contact element, and showing a workpiece in position.

There is shown in the drawing a chuck 11 having a threaded shank 12 adapted to be mounted in a conventional electric stud-welding gun. At one end of shank 12 is an enlarged head 13 which is circular in cross section and provided with a face 14. Shank 12 and head 13 are preferably made of steel or other electrically-conducting material.

Preferably head 13 is cylindrical in shape but if desired can be formed so that the periphery thereof has a slight taper in an axial direction. Two concave semicircular jaw members 15 and 16, made of brass, copper or other electrically-conductive material, are disposed with the concave portions thereof against the periphery of head 13. Jaw members 15 and 16 are disposed in diametrically opposed relation and extend beyond face 14 to provide gripping positions 17 and 18. Jaw 15 is rigidly secured to head 13 by a pair of screws 19 each having a head 20 which bears against the outside of jaw 15 and a shank 21 which is threaded into head 13. Screws 19 are preferably spaced about 90° apart relative to the periphery of head 13 and jaw 15.

Jaw 16 is resiliently mounted relative to head 13 in order that jaw 16 can move transversely relative to jaw 15 and head 13. Head 13 adjacent jaw 16 is provided with a pair of radial bores 22 which are preferably spaced about 90° apart relative to the periphery of head 13 and jaw 16. Disposed in the radially inward noncircular portion of each bore 22 is a nut 24 having an offset shoulder 25. Nut 24 can move radially in bore 22 but can not rotate. Threaded in the radially outward portion of each bore 22 is a plug 26 having a central opening 27. A compression spring 28 is disposed in each bore 22 and seats at one end against plug 26 and at its other end against shoulder 25 of nut 24. A pair of screws 29 each having a head 30 and threaded shank 31 are located each with head 30 bearing against the outside of jaw 16 and with shank 31 extending through an opening 32 in jaw 16, through opening 27 in plug 26, and through compression spring 28 into threaded engagement with nut 24. Openings 32 and 27 are of substantially larger size than the shanks 31 of screws 29 so that in operation screws 29 can tilt slightly in the openings without binding.

Chuck face 14 is formed centrally with a circular countersink 33. An annular contact element 34 of copper or other electrically-conducting material and having a central opening 35 is fitted within countersink 33 and protrudes beyond face 14 into the space between gripping portions 17 and 18 of jaws 15 and 16. Contact element 34 is retained in place by a pair of screws 36.

In Fig. 2 is shown a workpiece 37 in the form of a Nelson nail and comprising a disc-shaped head 38 of steel and an elongated thin shank 39 of steel having a pointed extremity 40. Shank 39 protrudes through disc head 38 to form a stud 41. The workpiece is shown in position in chuck 11 ready for welding.

In operation workpiece 37 is located for insertion into chuck 11 by bringing workpiece head 38 into position adjacent gripping portions 17 and 18 of jaws 15 and 16 with workpiece shank 39 extending away from chuck 11. The edge of workpiece head 38 is then forced against resilient jaw 16 to move the latter transversely against the action of springs 28 and spread jaws 15 and 16 following which workpiece 37 can be moved axially into the space between jaws 15 and 16 and guided by gripping portions 17 and 18 into contact with contact element 34. Under these conditions workpiece stud 41 projects into central opening 35 of element 34. When so located, workpiece 37 occupies the position shown in Fig. 2 and is resiliently gripped around its edge by gripping portions 17 and 18 of jaws 15 and 16. Workpiece head 38 is disposed in contact with element 34 throughout the large area of the interface therebetween to insure proper electrical contact.

Movement of jaw 16 away from head 13 occurs in the following manner. Movement of jaw 16 causes simultaneous movement of screws 29 and nuts 24 in a direction away from head 13 and effects compression of springs 28. During such movement screws 29 tilt slightly due to the fact that screws 29 are disposed at right angles to each other (Fig. 1) and therefore, not being in parallel relation, cannot both parallel the direction of movement of jaw 16. Such tilting movement is accommodated by the enlarged openings 32 in jaw 16 and the enlarged openings 27 in plug 26. The force with which jaws 15 and 16 yieldingly grip workpiece 37 can be regulated either before or during gripping of a workpiece by turning screws 29 to regulate the compression of springs 28 and thus regulate the force with which jaw 16 is resiliently urged toward head 13. After completion of the welding operation, chuck 11 and workpiece 37 can be separated by a slight twisting of the chuck and withdrawal thereof from the workpiece.

Because jaws 15 and 16 are detachable relative to chuck head 13, the jaws can be readily replaced by other jaws of different size, shape or material, and when worn out in use can be substituted by new jaws without need for substituting other new parts. Contact element 34 can also be individually replaced when worn out.

Figures 3, 4:
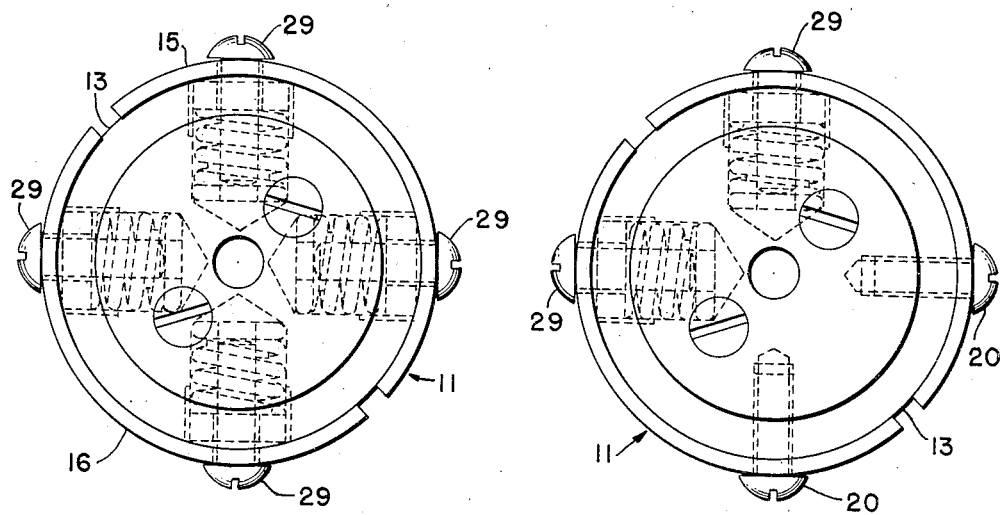
Fig. 3 is a view, similar to Fig. 1, of a modified form of chuck.
Fig. 4 is a view, similar to Fig. 1, of another modified form of chuck.

In Figs. 3 and 4 are shown modifications of the chuck and the same reference characters are used to identify parts which are duplicates of parts in Figs. 1 and 2. In Fig. 3 both jaws 15 and 16 are resiliently mounted relative to chuck head 13. In Fig. 4 each of jaws 15 and 16 has one bolt 20 threaded directly into chuck head 13 and a second bolt 29 which is part of a resilient mounting. In this form of the invention either of bolts 20 permits a slight rocking movement of its jaw 15 or 16 when the resilient mounting associated with bolt 29 yields to permit openings of the jaws. Operation of the modified form of chuck shown in Fig. 3 or in Fig. 4 is similar to operation of the form of chuck shown in Figs. 1 and 2.

Modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A chuck comprising a body, a plurality of jaws disposed about the periphery of said body at one end thereof, said jaws being disposed in opposed relation and extending beyond the end of said body, and means for securing at least one of said jaws to said body, said means for at least one jaw including a spring to secure yieldingly said jaw to said body for yieldingly gripping a workpiece, and means for adjusting the force exerted by said spring to adjust the gripping force of said jaws relative to a workpiece.

2. A chuck for gripping a workpiece, said chuck comprising a body, a plurality of jaws disposed about the periphery of said body at one end thereof, said jaws being disposed in opposed relation and extending beyond the end of said body, and a stationary electrical contact element secured to the end of said body between said jaws, said contact element having a central hole, said element being adapted to position and contact a workpiece when the workpiece is gripped by said jaws with said contact element surrounding a shank of the workpiece.

3. A chuck for use with a stud-welding gun and adapted to hold a workpiece to be stud welded, said chuck comprising a shank adapted to be secured to a stud-welding gun and a circular head at one end of the shank, said head having a face remote from said shank, a ring-shaped element of electrical contact material mounted at the center of said face and adapted to contact a workpiece to position the workpiece and make electrical contact therewith, a pair of concave semicircular jaw members with the concave portions disposed against the periphery of said head, said jaw members being disposed in opposed relation and extending beyond said face and adapted to position a workpiece and grip the edges thereof, said head having a radial bore adjacent at least one of said jaw members and means for resiliently mounting such jaw member relative to said head, said means comprising a plug having a central opening and disposed in said bore adjacent said jaw, a nut disposed in said bore in a location radially inward from said plug, a compression spring seating at one end against said plug and at the other end seating against said nut, and a screw having a head bearing against said jaw and a shank extending through said jaw, said plug, and said compression spring into threaded engagement with said nut.

4. A chuck for use with a stud-welding gun and adapted to hold a workpiece to be stud welded, said chuck comprising a shank adapted to be secured to a stud-welding gun and a circular head at one end of the shank, said head having a face remote from said shank, a ring-shaped element of electrical contact material mounted at the center of said face and adapted to contact a workpiece to position the workpiece and make electrical contact therewith, a pair of concave semicircular jaw members with the concave portions disposed against the periphery of said head, said jaw members being disposed in opposed relation and extending beyond said face and adapted to position a workpiece and grip the edges thereof, said head having a radial bore adjacent each of said jaw members, and means for resiliently mounting each of said jaw members relative to said head, said means comprising a plug having a central opening and disposed in said bore adjacent said jaw, a nut disposed in said bore in a location radially inward from said plug, a compression spring seating at one end against said plug and at the other end seating against said nut, and a screw having a head bearing against said jaw and a shank extending through said jaw, said plug and said compression spring into threaded engagement with said nut.

5. A chuck for use with a stud-welding gun and adapted to hold a workpiece to be stud welded, said chuck comprising a shank adapted to be secured to a stud-welding gun and a circular head at one end of the shank, said head having a face remote from said shank, a ring-shaped element of electrical contact material mounted at the center of said face and adapted to contact a workpiece to position the workpiece and make electrical contact therewith, a pair of concave semicircular jaw members with the concave portions disposed against the periphery of said head, said jaw members being disposed in opposed relation and extending beyond said face and adapted to position a workpiece and grip the edges thereof, a screw extending through one of said jaw members and threaded into said head for rigidly securing said jaw member to said head, said head having a radial bore adjacent the other of said jaw members, and means for resiliently mounting the other of said jaw members relative to said head, said means comprising a plug having a central opening and disposed in said bore adjacent said jaw, a nut disposed in said bore in a location radially inward from said plug, a compression spring seating at one end against said plug and at the other end seating against said nut, and a screw having a head bearing against said jaw and a shank extending through said jaw, said plug and said compression spring into threaded engagement with said nut.

6. A chuck for use with a stud-welding gun and adapted to hold a workpiece to be stud welded, said chuck comprising a shank adapted to be secured to a stud-welding gun and a circular head at one end of the shank, said head having a face remote from said shank, a ring-shaped element of electrical contact material mounted at the center of said face and adapted to contact a workpiece to position the workpiece and make electrical contact therewith, a pair of concave semicircular jaw members with the concave portions disposed against the periphery of said head, said jaw members being disposed in opposed relation and extending beyond said face and adapted to position a workpiece and grip the edges thereof, said head having a pair of radial bores at substantial right angles to each other adjacent each of said jaw members, and means associated with each of said bores for resiliently mounting each of said jaw members relative to said head, each of said means comprising a plug having a central opening and disposed in said bore adjacent said jaw, a nut disposed in said bore in a location radially inward from said plug, a compression spring seating at one end against said plug and at the other end seating against said nut, and a screw having a head bearing against said jaw and a shank extending through said jaw, said plug and said compression spring into threaded engagement with said nut.

7. A chuck for use with a stud-welding gun and adapted to hold a workpiece to be stud welded, said chuck comprising a shank adapted to be secured to a stud-welding gun and a circular head at one end of the shank, said head having a face remote from said shank, a ring-shaped element of electrical contact material mounted at the center of said face and adapted to contact a workpiece to position the workpiece and make electrical contact therewith, a pair of concave semicircular jaw members with the concave portions disposed against the periphery of said head, said jaw members being disposed in opposed relation and extending beyond said face and adapted to position a workpiece and grip the edges thereof, means for rigidly securing one of said jaw members to said head, said head having a pair of radial bores at substantial right angles to each other adjacent the other of said jaw members, and means associated with each of said bores for resiliently mounting said other jaw member relative to said head, each of said means comprising a plug having a central opening and disposed in a bore adjacent said other jaw, a nut disposed in said bore in a location radially inward from said plug, a compression spring seating at one end against said plug and at the other end seating against said nut, and a screw having a head bearing against said other jaw and a shank extending through said other jaw, said plug and said compression spring into threaded engagement with said nut.

8. A chuck for use with a stud-welding gun and adapted to hold a workpiece to be stud welded, said chuck comprising a shank adapted to be secured to a stud-welding gun and a circular head at one end of the shank, said head having a face remote from said shank, a pair of concave semicircular jaw members with the concave portions disposed against the periphery of said head, said jaw members being disposed in opposed relation and extending beyond said face and adapted to position a workpiece and grip the edges thereof, said head having a radial bore adjacent at least one of said jaw members and means for resiliently mounting such jaw member relative to said head, said means comprising a plug having a central opening and disposed in said bore adjacent said jaw, a nut disposed in said bore in a location radially inward from said plug, a compression spring seating at one end against said plug and at the other end seating against said nut, and a screw having a head bearing against said jaw and a shank extending through said jaw, said plug and said compression spring into threaded engagement with said nut.

9. A chuck comprising a body, a plurality of jaws disposed at one end thereof, said jaws being disposed in opposed relation, and means for securing at least one of said jaws to said body, said means for at least one jaw including a spring to secure yieldingly said jaw to said body for yieldingly gripping a workpiece, and means for adjusting the force exerted by said spring to adjust the gripping force of said jaws relative to a workpiece.

10. A chuck for gripping a workpiece, said chuck comprising a body, a plurality of jaws disposed at one end thereof, said jaws being disposed in opposed relation, and a stationary electrical contact element secured to the end of said body between said jaws, said contact element having a central hole, said element being adapted to position and contact a workpiece when the workpiece is gripped by said jaws with said contact element surrounding a shank of the workpiece.

IVAN V. THULIN.

REFERENCES CITED

The following references are of record in the file of this patent:

UNITED STATES PATENTS

| Number | Name | Date |
|---|---|---|
| 1,903,964 | Faust | Apr. 18, 1933 |
| 2,378,720 | Nelson | June 19, 1945 |
| 2,379,645 | Morris | July 3, 1945 |
| 2,412,080 | Cunningham | Dec. 3, 1946 |